US007437463B1

(12) United States Patent
Valletutti et al.

(10) Patent No.: US 7,437,463 B1
(45) Date of Patent: Oct. 14, 2008

(54) METHOD AND MEANS FOR PROVIDING SCHEDULING FOR A VIDEOCONFERENCING NETWORK IN A MANNER TO ENSURE BANDWIDTH

(75) Inventors: Michael J. Valletutti, Merritt Island, FL (US); John Benjamin Atha, Kennesaw, GA (US); Stephen Bentley, Canton, GA (US); Jon Shugart, Atlanta, GA (US)

(73) Assignee: Polycom, Inc., Pleasanton, CA (US)

( * ) Notice: Subject to any disclaimer, the term of this patent is extended or adjusted under 35 U.S.C. 154(b) by 366 days.

(21) Appl. No.: 10/325,644

(22) Filed: Dec. 20, 2002

Related U.S. Application Data

(60) Provisional application No. 60/390,664, filed on Jun. 21, 2002.

(51) Int. Cl.
G06F 15/16 (2006.01)
H04L 12/18 (2006.01)
(52) U.S. Cl. .................. 709/227; 709/219; 370/261
(58) Field of Classification Search ......... 709/217–219, 709/227–229; 370/259–261
See application file for complete search history.

(56) References Cited

U.S. PATENT DOCUMENTS

| 5,381,470 | A | * | 1/1995 | Cambray et al. | 379/216.01 |
|---|---|---|---|---|---|
| 5,408,526 | A | * | 4/1995 | McFarland et al. | 379/202.01 |
| 5,491,797 | A | * | 2/1996 | Thompson et al. | 709/204 |
| 5,729,687 | A | * | 3/1998 | Rothrock et al. | 709/204 |
| 5,784,561 | A | * | 7/1998 | Bruno et al. | 709/204 |
| 5,841,763 | A | * | 11/1998 | Leondires et al. | 370/260 |
| 5,991,276 | A | * | 11/1999 | Yamamoto | 370/260 |
| 5,999,966 | A | * | 12/1999 | McDougall et al. | 709/204 |
| 6,151,621 | A | * | 11/2000 | Colyer et al. | 709/204 |
| 6,157,401 | A | * | 12/2000 | Wiryaman | 348/14.09 |
| 6,181,786 | B1 | * | 1/2001 | Detampel et al. | 379/205.01 |
| 6,411,605 | B1 | * | 6/2002 | Vance et al. | 370/261 |
| 6,473,404 | B1 | * | 10/2002 | Kaplan et al. | 370/238 |
| 6,614,781 | B1 | * | 9/2003 | Elliott et al. | 370/352 |
| 6,633,324 | B2 | * | 10/2003 | Stephens, Jr. | 348/14.09 |
| 6,633,544 | B1 | * | 10/2003 | Rexford et al. | 370/238 |
| 6,671,262 | B1 | * | 12/2003 | Kung et al. | 370/260 |

(Continued)

OTHER PUBLICATIONS

Wong et al., Scheduling for Integrated Services in Next Generation Packet Broadcast Networks, 1999, IEEE.*

(Continued)

Primary Examiner—Joseph E Avellino
(74) Attorney, Agent, or Firm—Wong, Cabello, Lutsch, Rutherford & Brucculeri, LLP

(57) ABSTRACT

A method and system for scheduling and conducting videoconferences that ensure that the necessary bandwidth for the videoconference will be available and that select the least cost equipment to carry the videoconference. An embodiment of the present invention includes the steps of determining for a schedule request by a user if the necessary bandwidth to conduct a videoconference will be available. Also, the embodiment measures the performance of equipment and systems used to conduct the videoconference and determines if the equipment and systems are performing at a level necessary to conduct the videoconference. Alternative embodiments may include selecting multipoint endpoints to support the videoconference, scheduling videoconferences over two independent networks, emulating routers to ensure that the least cost route for the videoconference is selected, and responding to a scheduling request by informing the user to reschedule the videoconference when the network cannot support the videoconference.

5 Claims, 14 Drawing Sheets

U.S. PATENT DOCUMENTS

| | | | | |
|---|---|---|---|---|
| 6,738,387 | B1* | 5/2004 | Lin et al. | 370/429 |
| 6,822,947 | B2* | 11/2004 | Sawyer et al. | 370/328 |
| 2001/0015987 | A1* | 8/2001 | Wegner et al. | 370/503 |
| 2001/0043571 | A1* | 11/2001 | Jang et al. | 370/260 |
| 2002/0085490 | A1* | 7/2002 | O'Neil | 370/229 |
| 2003/0108033 | A1* | 6/2003 | Raisanen et al. | 370/352 |
| 2003/0110249 | A1* | 6/2003 | Buus et al. | 709/224 |

OTHER PUBLICATIONS

Fortino et al., Simulation of Multimedia System based on Actors and QoSsychronizers, 1999, IEEE.*

Neogi et al., Performance Analysis of an RSVP-Capable Router, 1999, IEEE.*

Ishida et al. "A delay-constrained least-cost path routing protocol and the synthesis method" Real-Time Computing Systems and Applications, 1998. Proceedings.*

* cited by examiner

METHOD AND MEANS FOR PROVIDING SCHEDULING FOR A VIDEOCONFERENCING NETWORK IN A MANNER TO ENSURE BANDWIDTH

STATEMENT OF RELATED PATENT APPLICATIONS

This non-provisional patent application claims priority under 35 U.S.C. § 119 to U.S. Provisional Patent Application No. 60/390,664, titled Method and Means for Providing Network Aware Scheduling for a Videoconferencing Network, filed Jun. 21, 2002. This provisional application is hereby fully incorporated herein by reference.

FIELD OF THE INVENTION

The present invention relates to software for scheduling and managing videoconferences over a computer network and, more specifically, to software that provides a method and means for scheduling and conducting videoconferences based on projected available bandwidth and network equipment capabilities.

BACKGROUND OF THE INVENTION

Advances in computer networks and telecommunications capabilities have led to advances in the capability of computer networks to support videoconferencing. Videoconferencing is similar to teleconferencing, that is, a meeting of more than two people conducted over a telecommunications system. With a videoconference, the teleconference is augmented by video communications between the parties. This communication can include video images of the participants and multimedia presentations, such as a Microsoft™ POWERPOINT™ presentation.

Videoconferencing originally relied on dedicated audio/visual communications equipment and dedicated telecommunication lines between the facilities or low quality communications over public-access telecommunications lines. Computer network advances, including the internet, have enabled equipment residing on Local Area Networks (LAN), including desktop computers to participate in a videoconference. These points on a network that can participate in a videoconference are referred to as "endpoints" in videoconferencing.

Voice, video, and other images are sent over a computer network as digital information. Network systems can carry only a finite amount of digital information at a given time. This digital information carrying capacity is called bandwidth. Network operations compete for bandwidth use. Also, the cost of information-carrying components is proportional to their information carrying capacity. This relationship makes bandwidth a valuable commodity in a network environment. Videoconferencing tends to require relatively large amounts of bandwidth. For example, a business quality videoconference typically requires at least six channels, or 384 kilobytes per second, of bandwidth.

Network administrators are usually responsible for ensuring that networks are continually available to meet all the needs of network users by allocating bandwidth for specific activities, including videoconferencing, at specific times of operation. One uncertainty this method of allocating bandwidth creates is whether a network will actually have available bandwidth to conduct the videoconference at the time the call is scheduled. This uncertainty can result in a company wasting valuable time and resources since personnel would not know until the scheduled time of the call that the videoconference cannot be conducted.

To connect videoconference calls between parties (endpoints) on different networks, the networks must have specialized equipment. This equipment includes codecs, multipoint control units (MCUs), gateways, gatekeepers, multipoint-capable endpoints, and desktop computers with direct connections to ISDN or other telecommunications lines. A codec, or coder-decoder is the core (or "engine") of a video conference system and is responsible for all of the encoding and decoding of information (audio and video). Before the transmission, the codec converts analog signals to digital signals and compresses the digital signals. Incoming audio and video must be decompressed and converted from digital back to analog.

MCUs, which are made up of both hardware and software components, are needed to support teleconferences with more than four participants and are an expensive resource for a network. MCUs have multiple ports to manage the call flow-control and processes and to distribute the audio, video, and data streams to the videoconference participants. Networks can have multiple MCUs. Gateways, which can be hardware and/or software, connect network endpoints to endpoints outside the network over ISDN or other telecommunications lines. Gatekeepers are software programs that manage bandwidth within a network zone. LANs may be divided up into zones. A gatekeeper manages bandwidth use for a particular network zone and determines if connections between zones have sufficient bandwidth to carry a videoconference call. Multipoint-capable endpoints are essentially mini MCUs and can videoconference with three other endpoints-without using an MCU. Finally, an endpoint, such as a desktop computer on the LAN, can have a direct connection to an ISDN or other telecommunications line. If this endpoint needs to connect to a videoconference involving others outside that endpoint's network zone, the call can be initiated without using an MCU.

Because MCUs are expensive to purchase and operate, it is desirable for a network administrator to minimize the number of MCUs on the network. The administrator typically strives to purchase and maintain only the number of MCUs necessary to support anticipated call volume and no more. For efficient equipment use, a network administrator will use other equipment, such as multipoint capable endpoints, to service the calls rather than the more valuable resource of an MCU port when possible.

Traditionally, the process of scheduling videoconferences is analogous to scheduling any event on a common calendar. Participants who want to schedule a videoconference first look to see the availability of the videoconferencing equipment. For example, existing videoconferencing systems often include scheduling software, such as Microsoft™ OUTLOOK™ or other similar desktop scheduling application. With these known systems, a participant can initiate the scheduling application and determine from the calendar whether the videoconferencing equipment is available on a given day at a given time. The scheduling software may also allow the participant to reserve specific equipment at a specific time. For example, the participant may reserve a conference room with videoconference equipment for a given day and a given block of time. The software will then indicate to other individuals who attempt to schedule a videoconference that that conference room at that particular time is reserved. The scheduling software may also send a message to each of the videoconference participants' computers alerting them of the scheduled videoconference. This message may be configured to alert the participants a short time before the videoconference is to start.

While conventional videoconferencing systems allow for the reserving of videoconferencing assets, such as conference rooms and equipment, these systems are unable to ensure, at the time a call is scheduled, that the required bandwidth will actually be available when the call is made. Instead, these systems take a wait-and-see approach, where the call is attempted at the scheduled time and only then do the participants know if the call will actually be established. Also, conventional videoconferencing systems are incapable of determining the "least cost" port to carry the call, that is, the port that has the least value as a network resource yet is still able to meet the demands of the scheduled call. Finally, participants of a pending call do not know if system performance will adversely affect the performance of the videoconference.

What is needed is a software program that can ensure that the bandwidth required for a videoconference call will be available at the time a scheduled call is made. What is also needed is a software program that optimizes the use of network resources by using the least cost port for completing the scheduled call and ensures that these resources are operating properly.

SUMMARY OF THE INVENTION

The present invention provides a method and means for scheduling a videoconference over a computer network that ensures that the necessary bandwidth for the call will actually be available when the call is made and that selects the least cost equipment to carry the call.

The present invention is a method for scheduling a videoconference over a computer network, including the steps of predicting, for a schedule request, if the necessary bandwidth to conduct a videoconference will be available. The method can predict the amount of bandwidth available on a computer network for conducting a videoconference and determine, based on that prediction, whether a sufficient quantity of bandwidth exists to conduct the videoconference. The method then can reserve videoconferencing equipment and facilities to be used for that call. Also, the method can evaluate the performance of equipment used for videoconferencing and inform technical support personnel or participants of an upcoming videoconference of any problems with the equipment. Additionally, the method can determine if an unscheduled videoconference can be conducted based on bandwidth allocated to videoconferences already scheduled. The present invention also includes means for implementing the method.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Figure 1:
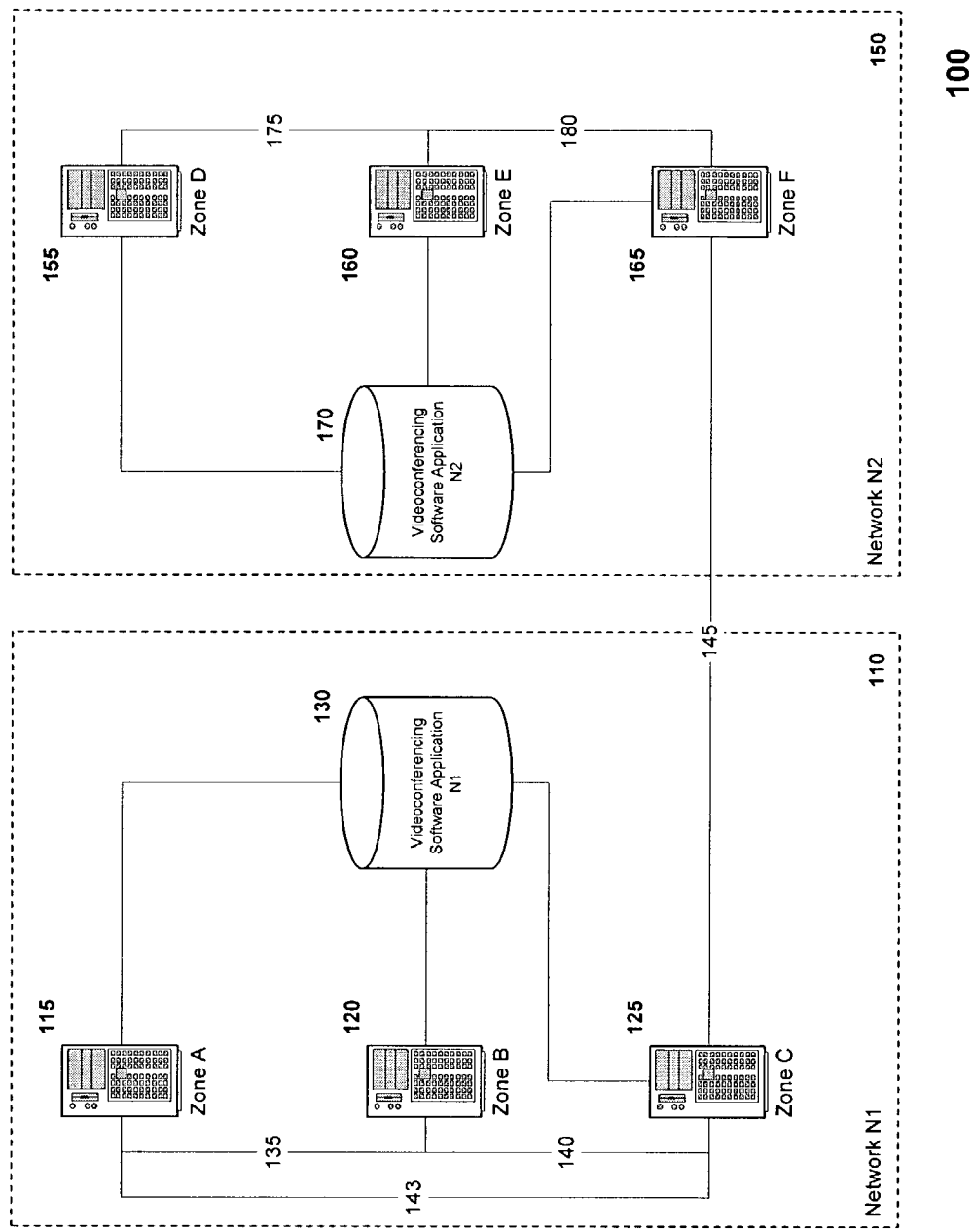
FIG. 1 presents an overview of the operating environment for an exemplary embodiment of the present invention.

The present invention provides a method and means for scheduling videoconferences to be conducted over a computer network. FIG. 1 presents an overview of a possible operating environment 100 for an exemplary embodiment of the present invention. A network N1 110, such as a LAN, consists of three zones, Zone A 115, Zone B 120, and Zone C 125. A server software component 500 (FIG. 5) of the exemplary embodiment of the videoconferencing software application resides on a server servicing a zone. Each server has access to a common videoconferencing software application database 130. Zone A 115 is connected to Zone B 120 using a dedicated telecommunications line 135, such as a T-1 line. Similarly, Zone B 120 is connected to Zone C 125 with a dedicated telecommunications line 140. Also, Zone A 115 is connected to Zone C 125 with a dedicated telecommunications line 143. Although each zone in this exemplary operating environment is shown as connected to every other zone, this zone-to-zone direct connection is not necessary. Zone A 115 could be connected to Zone C 125 through Zone B 120 only.

A network N2 150, such as a LAN, consists of three zones, Zone D 155, Zone E 160, and Zone F 165. A server software component 500 (see FIG. 5) of the exemplary embodiment of the videoconferencing software application resides on a server servicing a zone. Each server has access to a common videoconferencing software application database 170. Zone D 155 is connected to Zone E 160 using a dedicated telecommunications line 175, such as a T-1 line. Similarly, Zone E 120 is connected to Zone F 165 with a dedicated telecommunications line 180.

Network N1 110 and network N2 150 may be components in a wide area network (WAN). Typically, LANs do not have more than 100 endpoints. As such, a large organization may have multiple LANs. Also, organizations might have facilities that are geographically separate, with LANs at each location. In the exemplary operating environment depicted in FIG. 1, the networks N1 110 and N2 150 may be connected with a dedicated telecommunications line 145, such as a T-1 line. In the exemplary embodiment of the present invention, the two videoconference software application databases 130, 170 do not interact directly.

The overview of the operating environment for an exemplary embodiment of the present invention is presented to provide a better understanding of the exemplary embodiment. One skilled in the art would appreciate that the exemplary embodiment could operate on any network environment capable of supporting videoconferencing.

Figure 2:
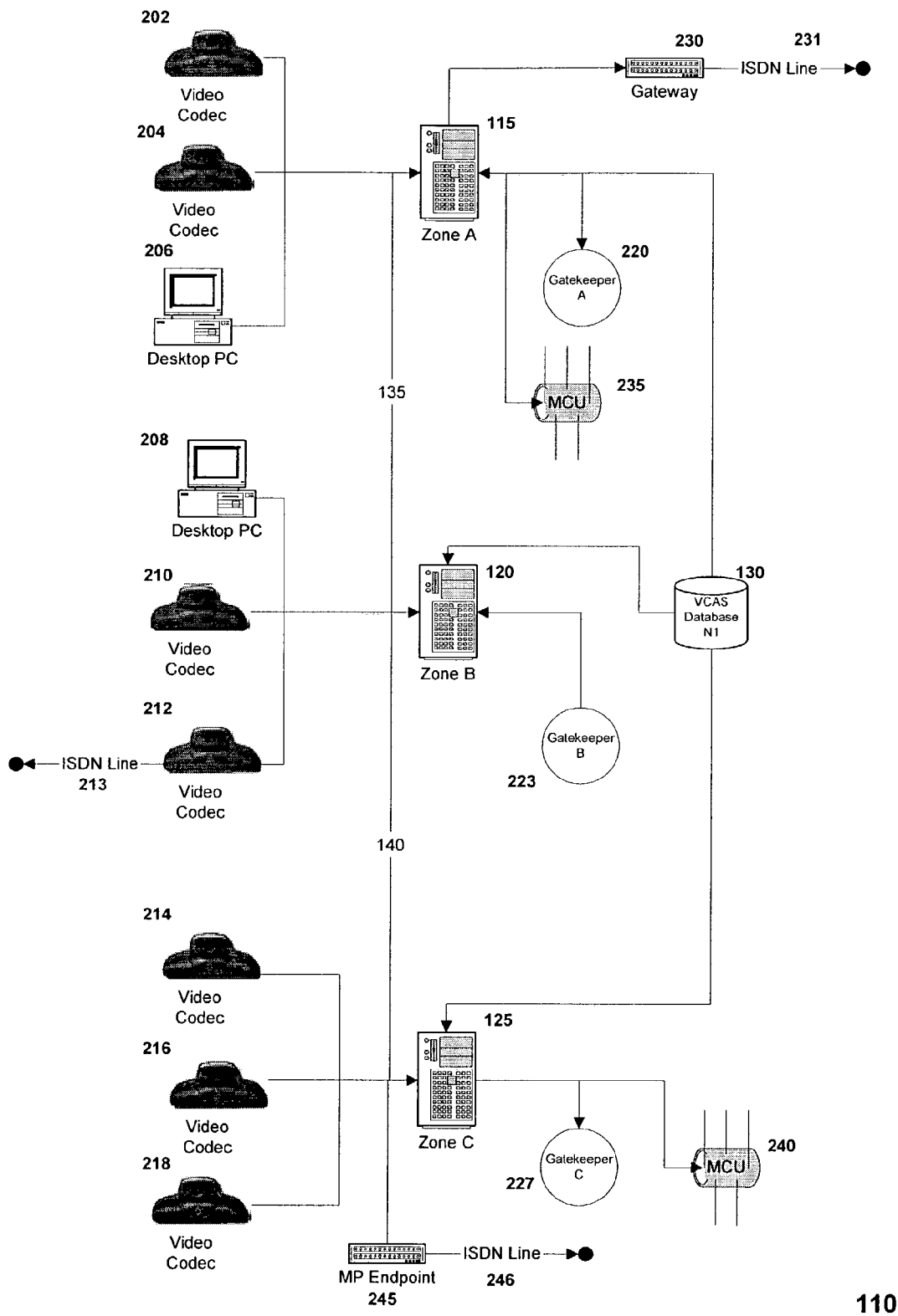
FIG. 2 presents details of the operating environment for an exemplary embodiment of the present invention.

FIG. 2 details network N1 110 on the operating environment for an exemplary embodiment of the present invention. Each zone of the network N1 110 consists of any number of endpoints such as video-enabled desktop personal computers (PCs) 206, 208 and video codecs 202, 204, 210, 212, 214, 216, 218. In a preferred embodiment, a client software component 400 (FIG. 4) of the exemplary embodiment of the videoconferencing software application resides on any connected desktop PC that is used to schedule a videoconference. Each zone may also have other peripheral equipment, such as printers, scanners, plotters, faxes, modems, and similar equipment (not pictured). Also, a variety of equipment and systems that support videoconferencing may be connected to network N1 110. These equipment and systems include gateway 230, which is connected to ISDN line 231, MCUs 235, 240, and multipoint endpoint 245, which is connected to ISDN line 246. Also, each zone may include a gatekeeper 220, 223, 227. Additionally, one or more of the video-enabled equipment may be connected directly to a telecommunications line, such as the video codec 212, which is connected directly to ISDN Line 213.

Figure 3:
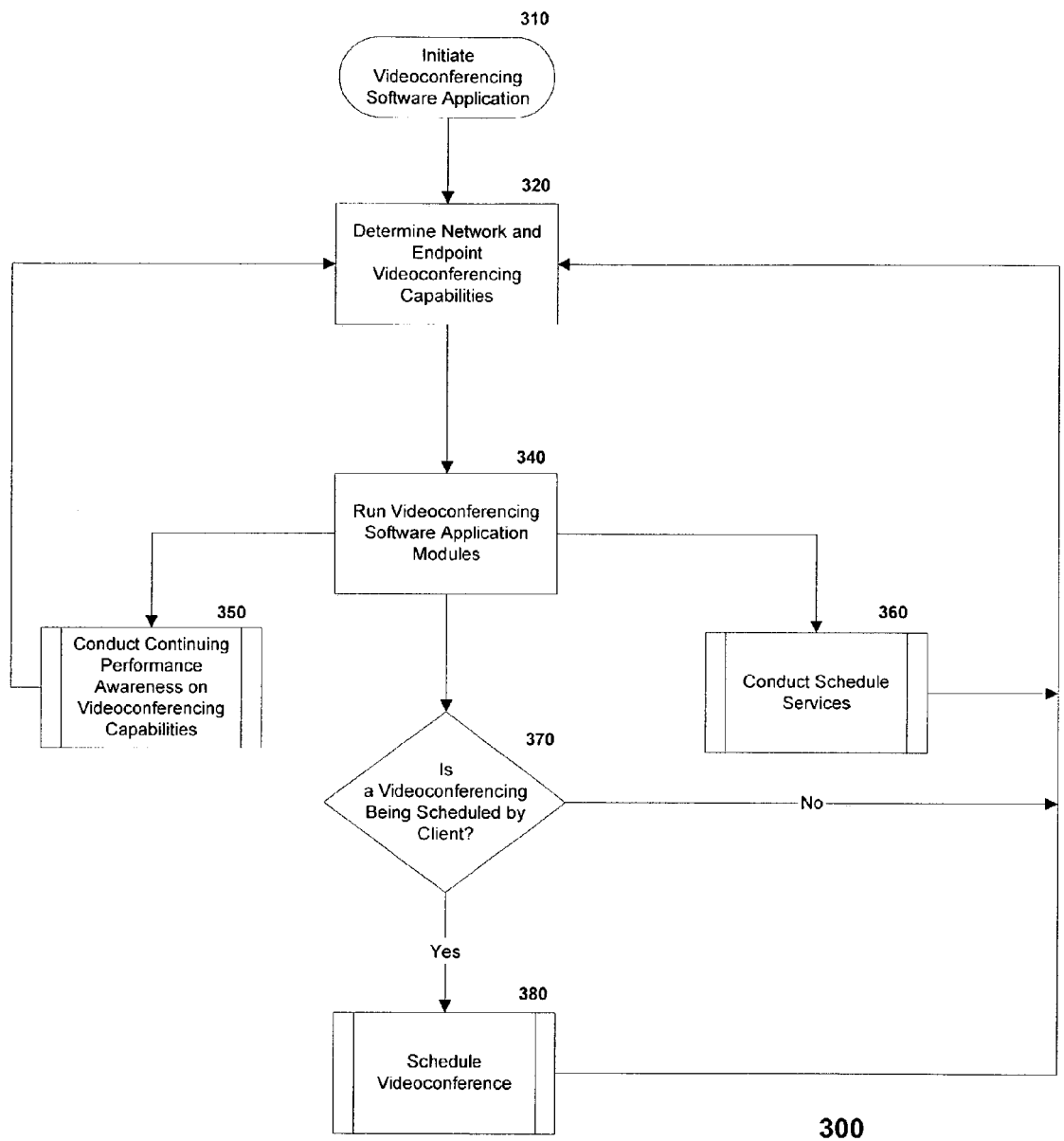
FIG. 3 is a flow chart that presents an overall process flow diagram for an exemplary embodiment of the present invention.

The exemplary embodiment of the videoconferencing software application inventories, monitors, and evaluates the videoconferencing assets of the network N1 110 to effectively schedule and conduct videoconferences. FIG. 3 presents an overall process flow diagram 300 for the exemplary embodiment of the videoconferencing software application. At step 310, the videoconferencing software application is initiated. The server application component is initiated by the network administrator or another person responsible for maintaining the computer network. The client application is initiated by a user of a desktop PC containing the client application. At step 320, the application determines the network and endpoint videoconferencing capabilities. This step includes conducting an inventory of hardware assets, such as MCUs, multipoint endpoints, gateways, and desktop computers with direct access to an ISDN line or other suitable telecommunications line. In the exemplary embodiment, the network administrator or other user of the system creates a network topology with equipment, bandwidth limitations, and zones, inter-zone router protocols, and areas-of-equipment locations. The server software component can automatically detect some hardware assets to assist in constructing this topography. The topography is then entered as input data into the server software component. These data comprise equipment tables that are queried during software operations.

Referring back to FIG. 1, Zone A 115 is connected to Zone B 120 using a dedicated telecommunications line 135, Zone B 120 is connected to Zone C 125 with a dedicated telecommunications line 140, and Zone A 115 is connected to Zone C 125 with a dedicated telecommunications line 143. Videoconference data that needs to go from Zone A 115 to Zone C 125 could travel directly over line 143 or line 135 to Zone B 120 then line 140 to Zone C 125. Data is routed in and out of a network zone by a hardware component known as a router (not shown). Routers include protocols that dictate how data is forwarded through the network. For example, the router at Zone A 115 could have a protocol that will send videoconference data from Zone A 115 to Zone C 125 over line 143 only. The exemplary embodiment of the present invention can emulate this router protocol. In other words, the exemplary embodiment of the videoconferencing software application incorporates the router protocol into the software's decision logic. In determining the availability of bandwidth and videoconferencing equipment for a videoconference, the exemplary embodiment will evaluate configurations that route the data according to the router protocols for the network.

Most of today's routers use one of four protocols to determine which route represents the least cost path between zones. Static Routing allows the system administrator to force particular routes for each destination. Routing Information Protocol (RIP) provides a simple method for interconnected routers to exchange route information. Using RIP, least cost routes are calculated based on the number of "hops," usually routers, between source and destination. RIP eliminates the need for the system administrator to predefine the entire network matrix. Open Shortest Path First (OSPF) is the most popular industry standard protocol for routing information exchange. Using OSPF, least cost routes are calculated based on the maximum bandwidth availability between source and destination. Interior Gateway Routing Protocol (IGRP) is another industry standard protocol for routing information exchange. Using IGRP, least cost routes are calculated using a formula which includes maximum bandwidth between source and destination and packet transport delay between source and destination.

The exemplary embodiment of the present invention may be regarded as a collection of modules. Each module serves a function in the overall application, such as scheduling, measuring performance, or controlling the application. Referring back to FIG. 3, at step 340, the videoconferencing software application modules run. The modules both have continuous functions and respond to specific directions. In the exemplary embodiment of the present invention, these modules include Schedule Service, PanAlert, and client-side scheduling using a predictive scheduling engine. Other modules run to support these and other functions of the exemplary embodiment. Individual software modules are discussed in greater detail below in conjunction with FIGS. 4 and 5.

Figure 4:
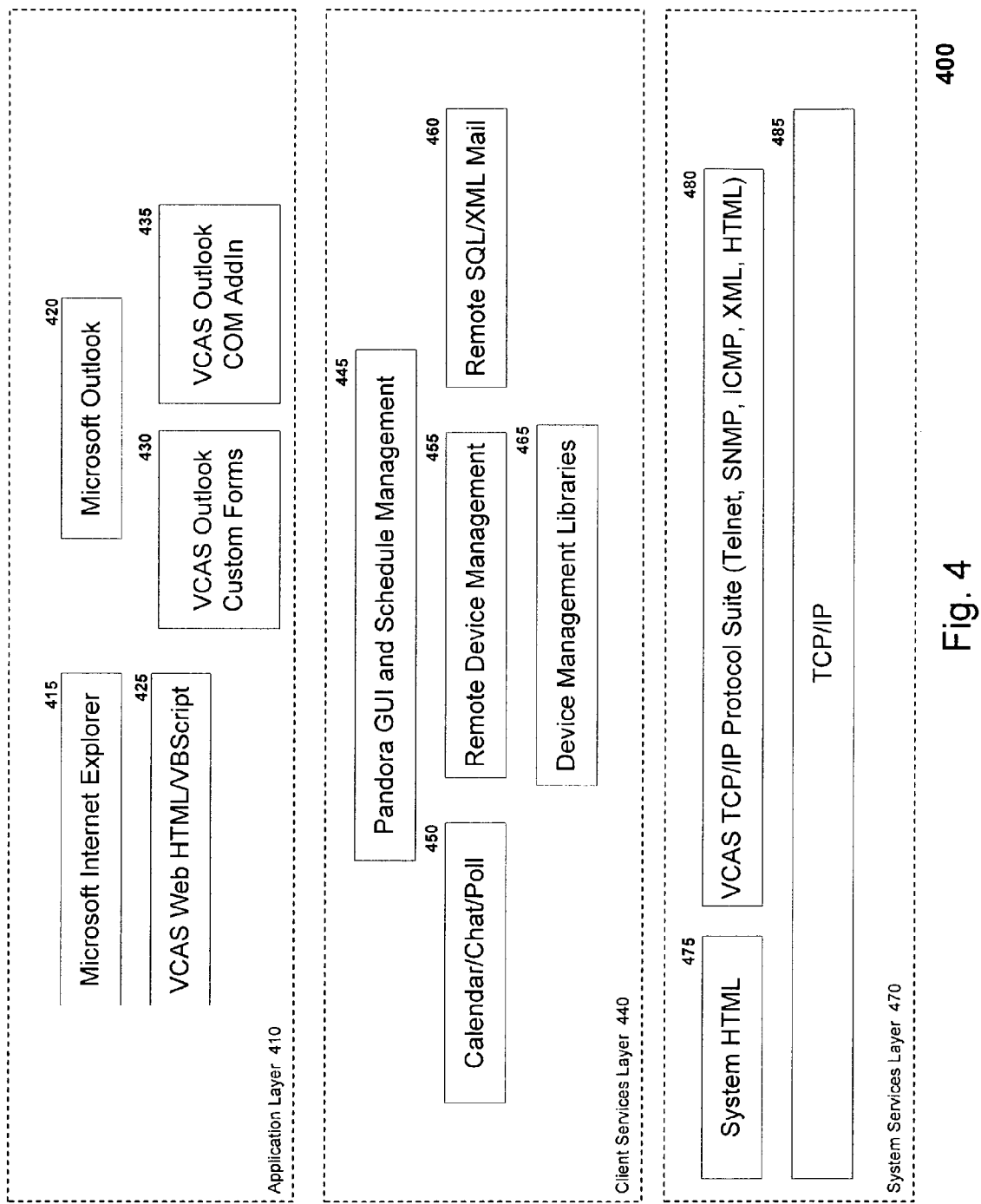
FIG. 4 presents the architecture of the software for the Client component of an exemplary embodiment of the present invention.
Figure 12A:
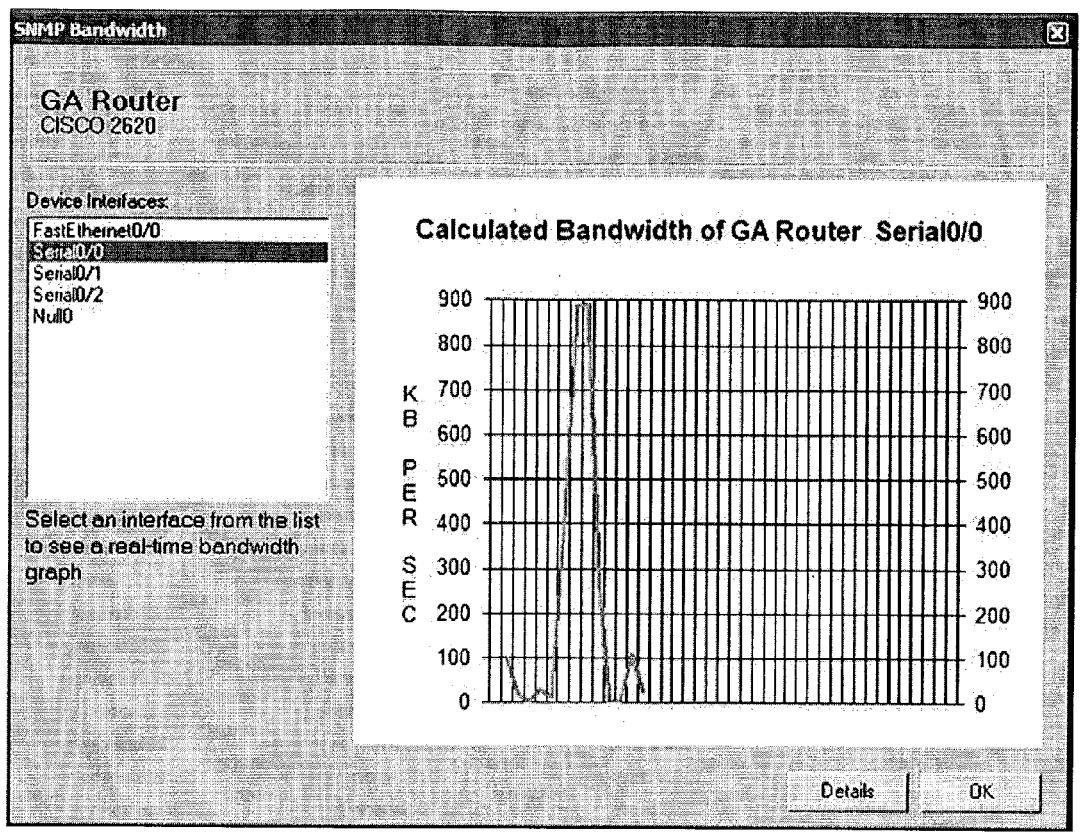
FIG. 12a presents a screen shot showing a performance graph for an exemplary embodiment of the present invention.
Figure 12B:
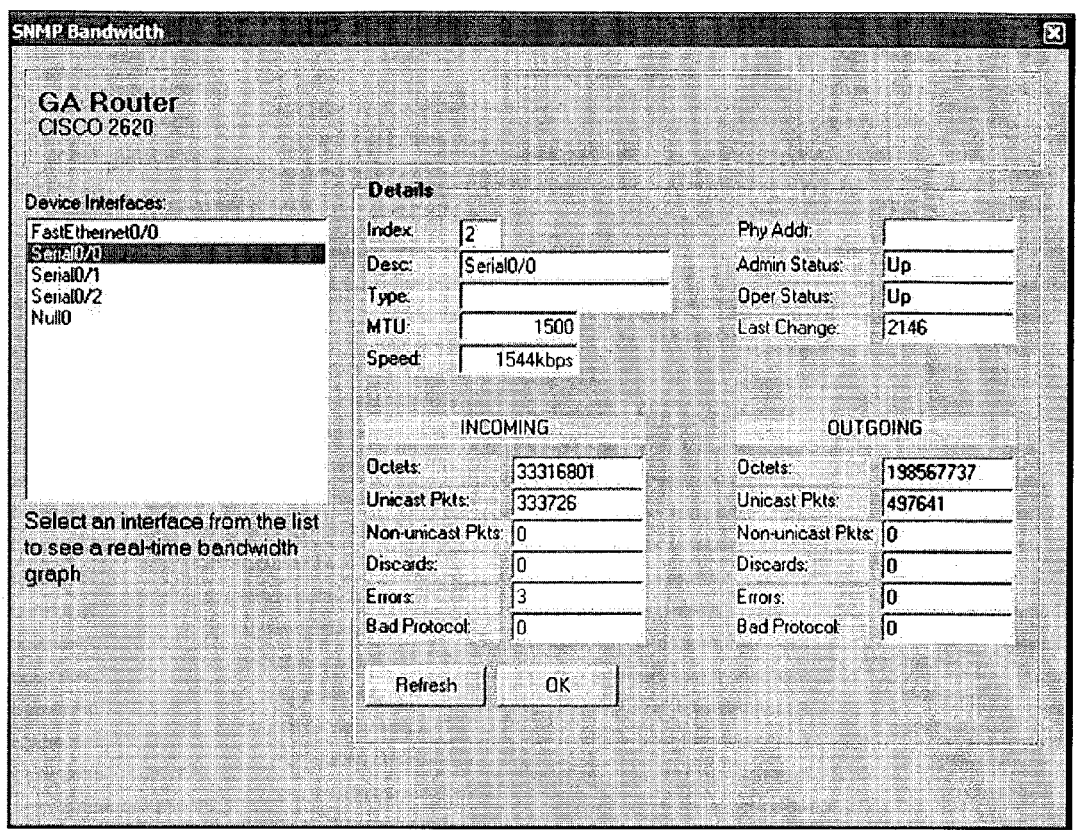
FIG. 12b presents a screen shot showing performance statistics for an exemplary embodiment of the present invention.

At step 350, the exemplary embodiment of the present invention begins continuously monitoring the performance of videoconference equipment and systems, using the PanAlert module (FIG. 4, below). This step may include latency monitoring, jitter testing, simple network management protocol (SNMP) graphs and calculations, and alerts. Latency is the time it takes for a data packet to move across a network connection. Together with bandwidth, latency determines the speed of a network connection. A higher-than-acceptable latency value may cause the participants of a videoconference to notice a time lag between hearing participants' voices and seeing their mouths move. Jitter is the difference in travel times of two consecutive data packets, the variance in latency. Excess jitter causes a poor quality call. SNMP is an application layer protocol that facilitates the exchange of management information between network devices. The protocol is part of the Transmission Control Protocol/Internet Protocol (TCP/IP) protocol suite. SNMP enables network administrators to manage network performance, find and solve network problems, and plan for network growth. The performance monitoring done by the SNMP may include the creation and presentation of graphs or other visual representations. Performance monitoring is described in more detail below with reference to FIG. 9. FIGS. 12a and 12b present screen shots from an exemplary embodiment of the present invention showing a performance graph and performance statistics, respectively. The monitoring step returns to step 320 and the equipment data are updated if necessary based on the performance check.

At step 370, operating in parallel to step 350, the exemplary embodiment determines if a request to schedule a videoconference has been made. If so, the application initiates and runs the videoconference scheduling module at step 380. This step is described in greater detail below with reference to FIG. 7. If not, or after the scheduling module is run, the program returns to step 320 and continues the monitoring process and awaits any further direction, e.g., to schedule a videoconference.

At step 360, again in parallel with the other tasks, various schedule services are conducted. The extent of the services performed varies based on the conferences scheduled and the time until each scheduled conference is to begin and end. This step is discussed in detail below in conjunction with FIGS. 10 and 11.

Figure 5:
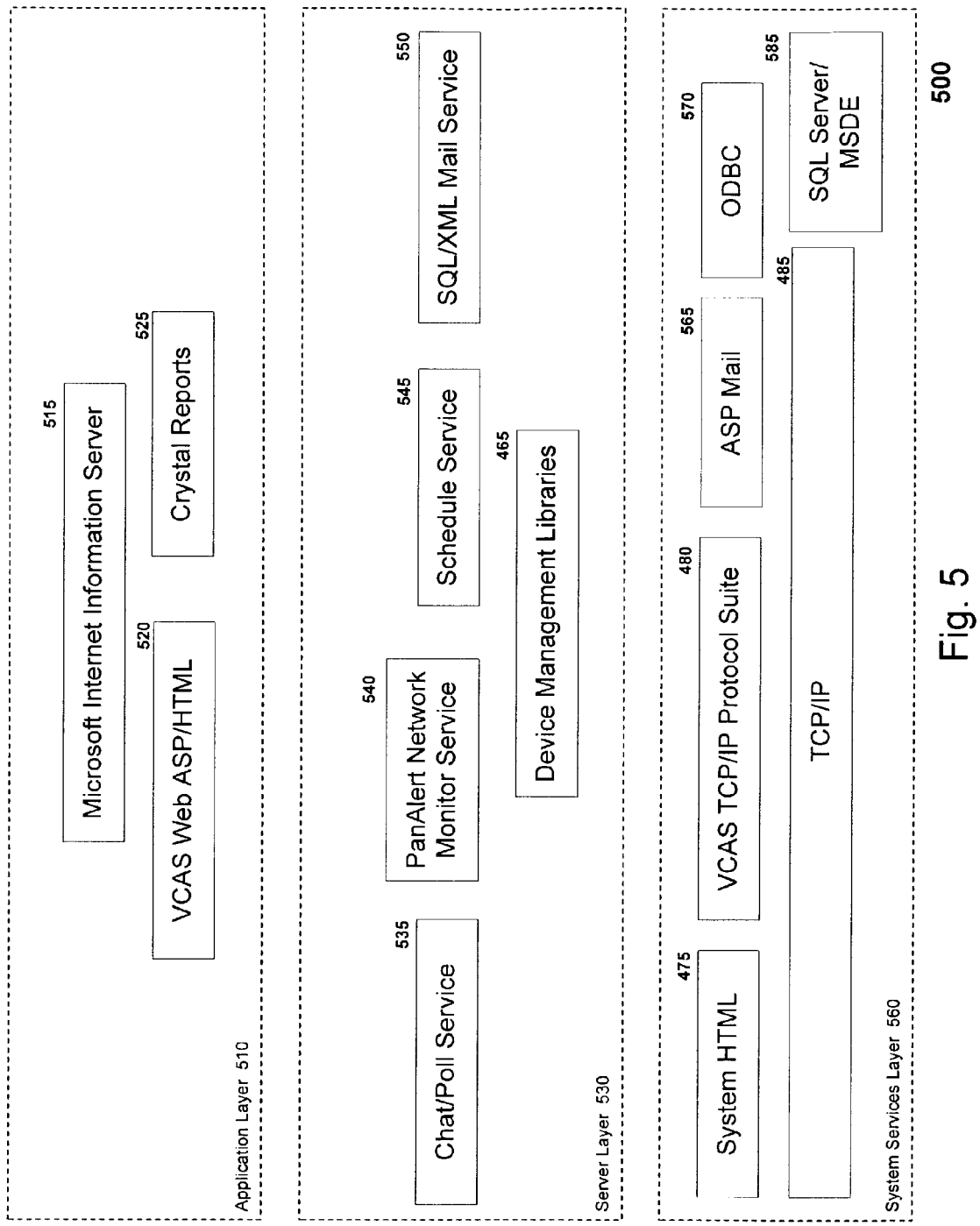
FIG. 5 presents the architecture of the software for the Server component of an exemplary embodiment of the present invention.

FIGS. 4 and 5 present the software architecture of the client 400 and server 500 software components of the exemplary embodiment, respectively. The architecture includes a combination of applications and protocols layered in three compartments. Referring to FIG. 4, the Application Layer 410 combines a commercially-available browser, such as Microsoft™ INTERNET EXPLORER™ 415, and a commercially-available scheduling application, such as Microsoft™ OUTLOOK™ 420, and various modules, including a VCAS Web HTML/VBScript module 425, a VCAS Outlook Custom Forms module 430, and a VCAS Outlook COM Add-In module 435. The VCAS Web HTML/VBScript module 425 provides a client user interface for database management, review, and reporting. The Outlook Custom Forms module 430 integrates the scheduling system of the exemplary embodiment into Microsoft™ OUTLOOK™, providing seamless scheduling functionality into Outlook's scheduling functions. The VCAS Outlook COM Add-In module 435 provides a user interface for remote database connectivity for scheduling under Microsoft™ OUTLOOK™.

The Client Services Layer 440 includes a Pandora Graphical User Interface and Schedule Management module 445, a calendar/chat/poll module 450, a remote device management module 455, a remote SQL/XML mail module 460, and a device management libraries module 465. The Pandora Graphical User Interface and Schedule Management module 445 provides a user interface for network management and control. This module also includes the predictive schedule engine. The function of this engine is discussed in greater detail below in conjunction with FIG. 7. The calendar/chat/poll module 450 provides a user interface for the client application to support functionality such as technical support, where the client user can enter a chat room to receive needed support. The remote device management module 455 provides communication and control capability of devices controllable using an Internet Protocol (IP) or RS-232 connection. The remote SQL/XML mail module 460 provides communication and data access to an SQL server over an IP connection using HTML commands. The device management libraries 465 provide communication and control of a variety of device functionality.

The System Services Layer 470 includes a system HTML module 475, a VCAS TCIP/IP Protocol Suite 480, and a TCP/IP protocol 485. The system HTML module 475 supports user interface. The VCAS TCIP/IP Protocol Suite 480 provides generic TCP/IP C++ classes. The TCP/IP protocol 485 is commercially available and is a standard protocol for communicating over the internet.

Referring to FIG. 5, as with the client application, the server application consists of three layers. The Application Layer 510 includes the commercial Microsoft™ Internet Information Server 515. It also includes the applications VCAS Web ASP/HTML 520 and Crystal Reports 525. VCAS Web ASP/HTML 520 provides an interface with the server component of the exemplary embodiment over the internet. Crystal Reports 525 is a commercially-available application used to generate status and other reports on system functions.

The Server Layer 530 includes a chat/poll service application 535, a PanAlert Network Monitoring Service application 540, a schedule service application 545, a SQL/XML mail service 550, and device management libraries 465. The chat/poll service application 535 allows a client to chat with a system administrator or other server-side user to receive real-time technical support or other communications. The PanAlert Network Monitoring Service application 540 performs equipment monitoring and alerts users and technical support personnel when equipment parameters are outside prescribed criteria. This function is discussed in greater detail in conjunction with FIG. 9, below. The schedule service application 545 supports the scheduling, authorization service, and auto-launching features of the exemplary embodiment. These functions are discussed in greater detail below, in conjunction with FIGS. 7, 10, and 11. The SQL/XML mail service 550 provides remote data access to Open Database Connectivity (ODBC) sources.

The System Services Layer 560 includes a system HTML application 475, a TCIP/IP Protocol Suite 480, and a TCP/IP protocol 485. This layer also includes an ASP mail application 565, an ODBC application 570, and a SQL Server/MSDE application 585. The ASP mail application 565 is a commercial application that provides SMTP services. The ODBC application 570 is a commercial program that provides database access. The SQL Server/MSDE application 585 is a commercial program that provides data storage management.

Figure 6:
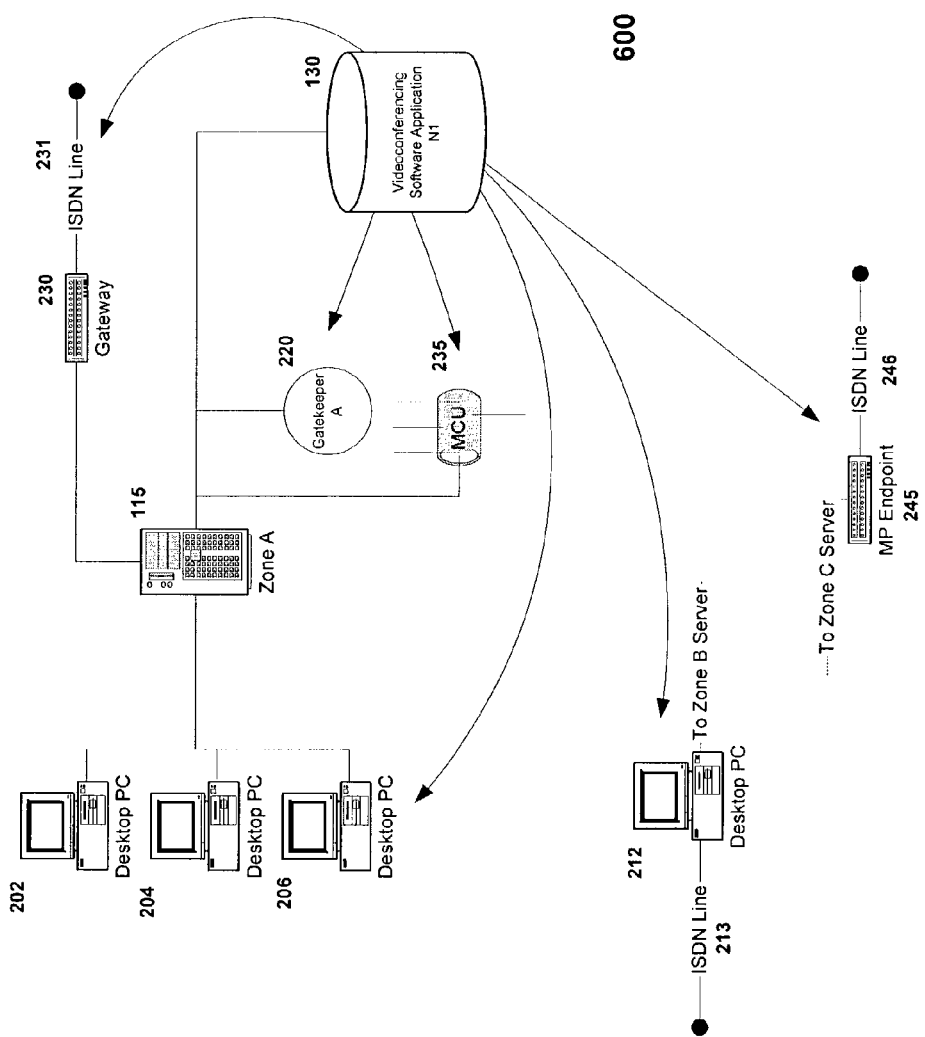
FIG. 6 illustrates network performance awareness for an exemplary embodiment of the present invention.

FIG. 6 is a schematic diagram illustrating one process of performing network performance awareness monitoring 600 for a small segment of a network. The performance awareness monitoring module monitors the performance of videoconferencing assets, such as Gatekeeper A 220, MCU 235, desktop PC 206, video codec 212 with dedicated ISDN line 213, and multipoint endpoint 245 with ISDN line 246. According to an exemplary embodiment of the present invention, data packets are constantly sent to the network components (i.e., "pings" these components) to assess the network latency and jitter. In other words, the data packets are sent to the videoconferencing assets in order to simulate data packets send during a videoconference. The application also provides the capabilities of delivering SNMP graphing and statistics, i.e., visual representations of system performance in terms of graphs and calculated performance values. One skilled in the art would appreciate that this module could measure and display the performance levels of any aspect of the network. A general process flow diagram for network performance awareness is discussed below in relation to FIG. 9.

Figure 7A:
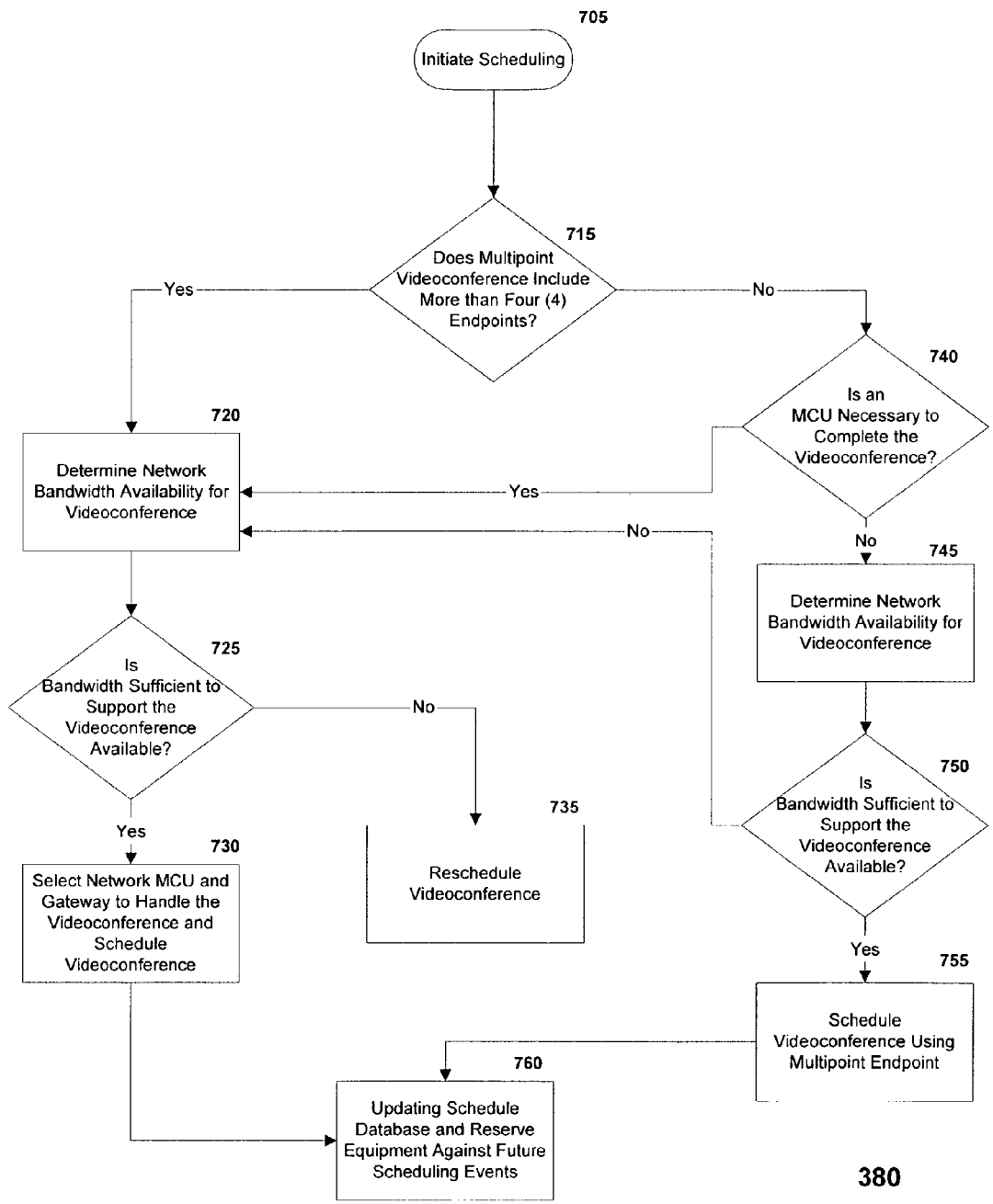
FIG. 7a is a flow chart that presents the process flow for the least cost route and port analysis of an exemplary embodiment of the present invention.

FIG. 7a presents a general flow diagram for the least cost route and port analysis process component of the scheduling module 380 of the exemplary embodiment. This process of the exemplary embodiment determines network bandwidth availability at the time a call is scheduled, using network-administrator-defined limits to predict future bandwidth availability within zones and WAN Pipe or virtual bandwidth capabilities between zones for the scheduled call time. Additionally, the process identifies the least cost gateway path and calculates future ISDN port usage of that gateway path prior to allowing a schedule to be completed. Gateway path reservations also take into account WAN Pipe limitations for remote gateway reservation. At step 705, the scheduling module is initiated. This initiation can occur through a desktop scheduling program, such as Microsoft™ Outlook™, with the videoconference scheduling functionality described herein added into the commercially-available program through add-in programs and forms.

At step 715, the process determines if more than four endpoints are involved in the videoconference. If yes, the process moves to step 720. At this step, the process determines the availability of bandwidth for the videoconference using one of the available MCUs. This step includes two inquires. The first inquiry determines, based on the equipment characterization at step 320 (FIG. 3), what bandwidth resources are available. In the exemplary embodiment, this information comes ultimately from equipment tables built from data provided by system users. This data may also be updated based on system performance checks on available equipment. Additionally, a database of previously scheduled videoconferences is reviewed to determine if any of the available system bandwidth has been allocated for other videoconferences.

At step 725, the process determines if the available bandwidth is sufficient to support the videoconference. If so, the process moves to step 730 and selects the network MCU and gateway to handle the videoconference and schedules the videoconference. The process moves to step 760 and updates the database containing scheduled videoconference information and reserves videoconferencing equipment against future scheduling events. If sufficient bandwidth is not available as determined at step 725, the process moves to step 735 and the user is directed to reschedule the videoconference.

If the multipoint videoconference includes four or less endpoints, as determined at step 715, the process moves to step 740 and determines if one of the endpoints is a multipoint endpoint or connected to an ISDN line or other suitable telecommunications line such that the endpoint could support the videoconference without using an MCU. If an MCU is necessary to complete the videoconference, the process moves to step 720 and completes the process as described above. If an MCU is not necessary, the process moves to step 745 and determines if network bandwidth is available for the videoconference. At step 750, the process determines if the available bandwidth is sufficient for the videoconference. If not, it moves to step 720 and tries to schedule the videoconference with MCU assets. If the bandwidth is available, the videoconference is scheduled at step 755 and the equipment necessary to conduct the videoconference is reserved at step 760. Also at step 760, the database containing information on scheduled videoconferences is updated to reflect the newly scheduled videoconference.

The exemplary embodiment of the present invention predicts bandwidth utilization during the scheduling process by reviewing defined telecommunications lines between defined zones. This predictive nature operates cleanly in a schedule only environment when a videoconference cannot be made without being scheduled. However, typically the end user has the ability to pick up a remote control and place a videoconference call without prior scheduling. A gatekeeper authorization function provides the exemplary embodiment with the ability to control these user actions. This function 700 is performed by the schedule service application 545 (FIG. 5) in the exemplary embodiment of the present invention and is presented in FIG. 7*b*.

Figure 7B:
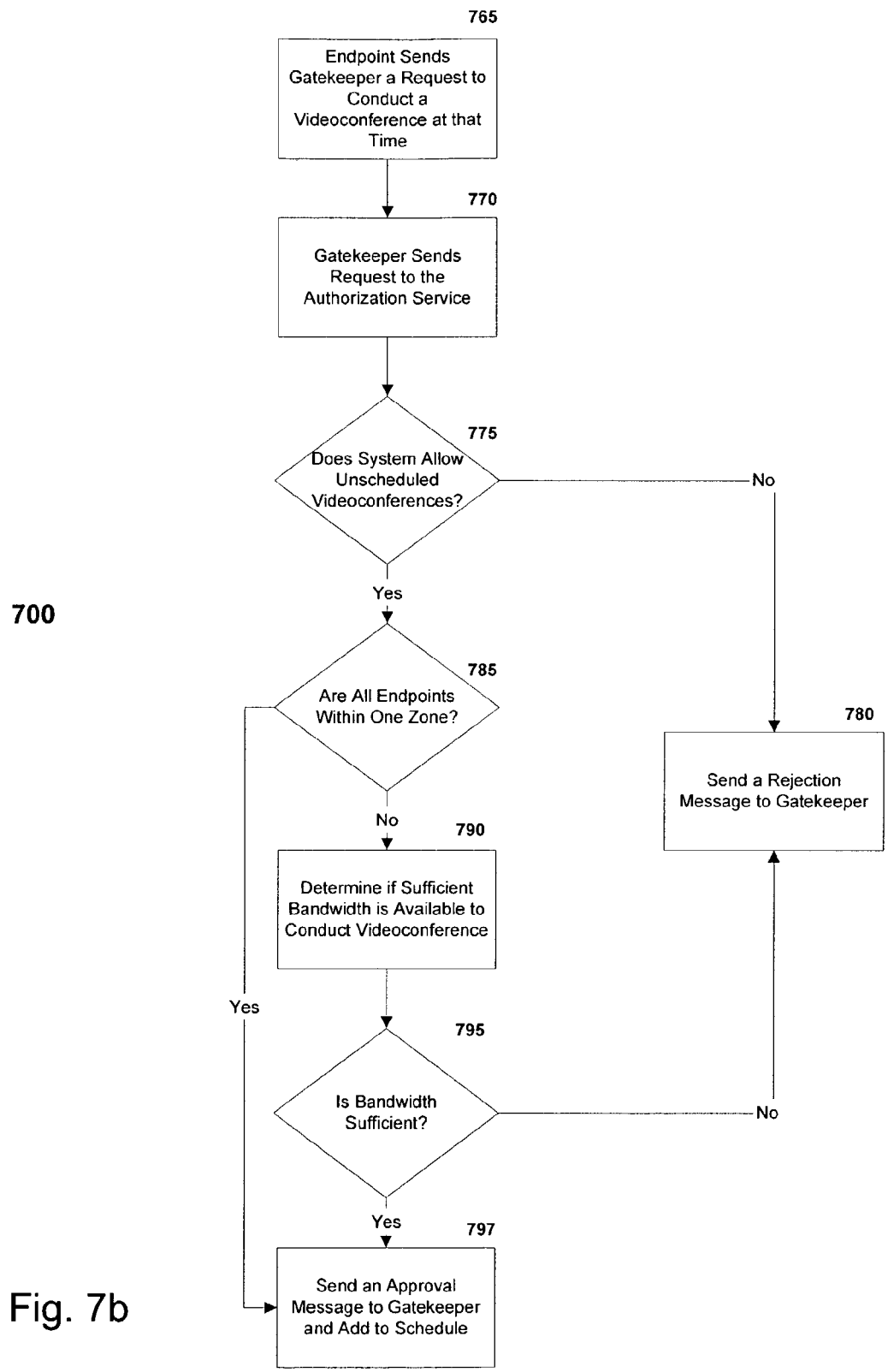
FIG. 7b is a flow chart that presents the process flow for authorization services of an exemplary embodiment of the present invention.

In an H.323 environment, videoconference requests initiated by the endpoint are sent to a gatekeeper via the Registration Admission Status (RAS) protocol. The gatekeeper validates these requests, determines bandwidth availability, translates videoconference addresses, and replies to the endpoint with permission or rejection of the videoconference request. Gatekeepers do not, however, have the inherent ability to look at future bandwidth usage and reject or shutdown videoconferences which may interfere with scheduled videoconferences. The gatekeeper authorization service performs this function. In an authorized environment the videoconference flow operates as follows:

Referring to FIG. 7*b*, at step 765, an endpoint that wants to conduct a videoconference to begin at that time sends a request to conduct the videoconference to a gatekeeper for the zone containing the endpoint. This request includes, at a minimum, all of the endpoints to be on the videoconference and the duration of the videoconference. At step 770, this request is sent to the schedule service application 545 (FIG. 5), also referred to as the authorization service.

In an exemplary embodiment, the authorization service may not approve any videoconference requests for videoconferences that have not been scheduled through the process 380. At step 775, the process 700 determines if the system allows unscheduled videoconferences. If so, the process 700 proceeds to step 785. If not, the process moves to step 780 and sends a rejection message to the gatekeeper that requested the videoconference. The gatekeeper would then forward that rejection to the endpoint.

At step 785, the authorization system determines if all of the endpoints for the videoconference reside on the same network zone. If so, the process 700 skips to step 797 and sends an approval message to the gatekeeper requesting the videoconference. This message is forwarded to the endpoint making the request and the videoconference is initiated. Additionally, the videoconference is added to the videoconference schedule. If all of the endpoints are not within the same network zone, the process 700 moves to step 790.

At step 790, the authorization service determines if sufficient bandwidth exists to conduct the videoconference. This determination is made by reviewing the scheduled videoconferences during the time span for the requested videoconference to determine if the network bandwidth allocated for videoconferencing will be used for other, scheduled videoconferences. If insufficient bandwidth exists, the process 700 moves to step 780 and sends a rejection message to the gatekeeper that requested the videoconference. The gatekeeper would then forward that rejection to the endpoint. If sufficient bandwidth exists, the process 700 moves to step 797 and sends an approval message to the gatekeeper requesting the videoconference. This message is forwarded to the endpoint making the request and the videoconference is initiated. Additionally, the videoconference is added to the videoconference schedule.

Through this process, the exemplary embodiment ensures that the bandwidth predicted at step 760 is maintained. The exemplary embodiment provides two connection modes for the authorization service, inbound and outbound. For an inbound gatekeeper setup, the exemplary embodiment listens on a specified TCP/IP Port, usually Port 8000, for connections from gatekeepers. When a gatekeeper connects to the authorization service, TCP/IP communication is established and the link is maintained indefinitely for request passing. For an Outbound gatekeeper setup, the exemplary embodiment attempts to connect to a gatekeeper via a defined port and IP address at a specified interval. Once a connection is established, the link is maintained indefinitely for request passing.

The process of FIG. 7a describes a method for ensuring that a least cost port is selected for a call. One skilled in the art would appreciate that this method could be employed at a time just before a videoconference call is placed rather than, or in addition to, when the videoconference is scheduled.

Figure 8:
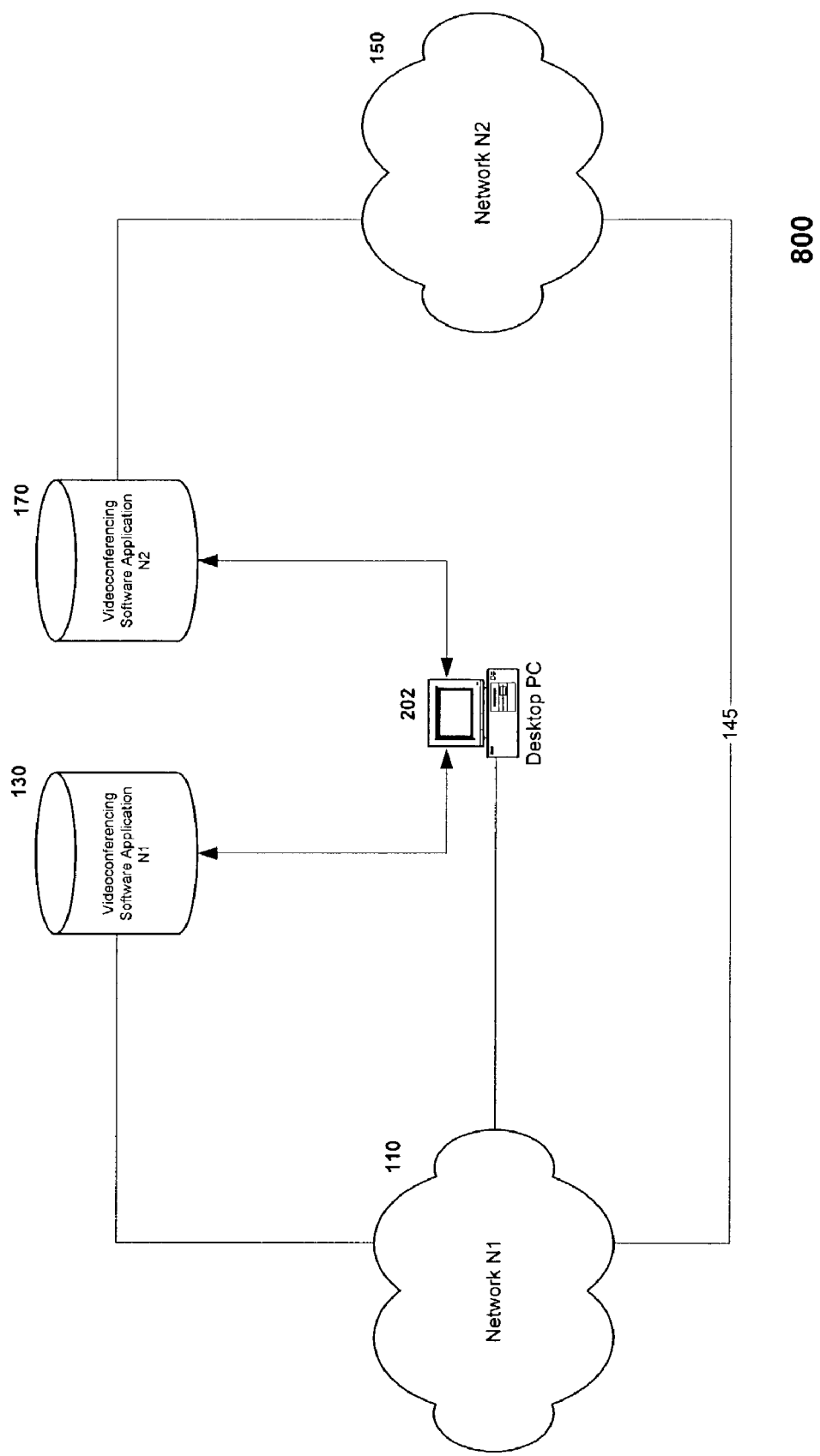
FIG. 8 is a flow chart that presents the process flow for the performance awareness measurements of an exemplary embodiment of the present invention.

In some cases, bandwidth must be available across two networks serviced by separate instances of the exemplary embodiment, such as shown in FIG. 1 with network N1 110 and network N2 150 connected by dedicated telecommunications line 145. FIG. 8 provides an example of the distributed scheduling function 800 of the exemplary embodiment of the current invention. In this example, the client application of the exemplary embodiment runs on desktop PC 202, which is on network N1 110. Desktop PC 202 runs a browser program, such as Microsoft™ INTERNET EXPLORER™. With this program and functionality add-in by the exemplary embodiment, the user at desktop 202 can access the server applications of the exemplary embodiment on both network N1 110 and network N2 150. Then, the scheduling module can be run for both network N1 110 and network N2 150 as described in FIG. 7 and the availability of bandwidth for the videoconference determined and, if available, the equipment necessary to conduct the videoconference reserved.

Figure 9:
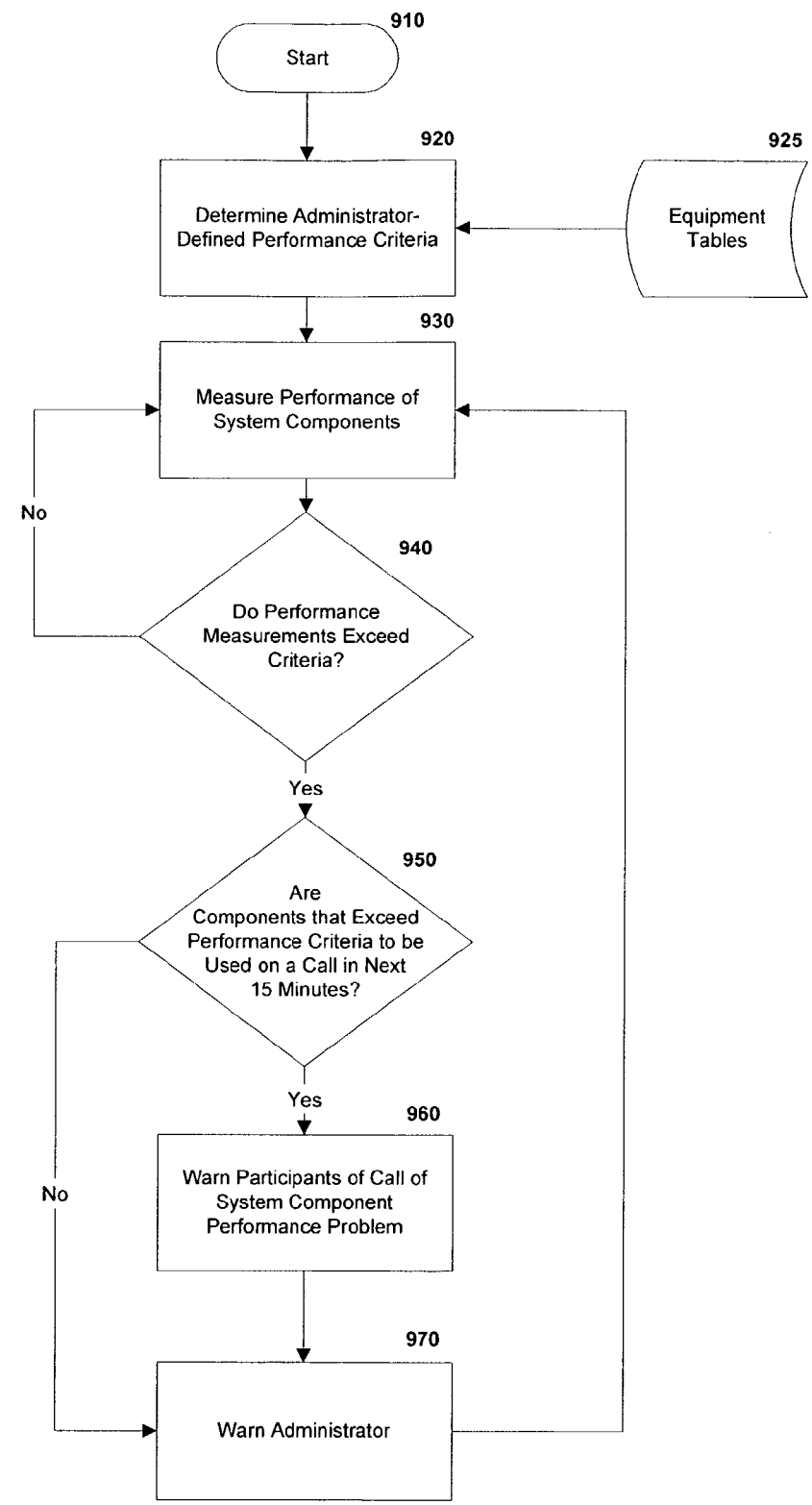
FIG. 9 illustrates distributed scheduling for an exemplary embodiment of the present invention.

FIG. 9 provides additional details of the performance awareness measurement process 350 in the exemplary embodiment of the present invention. In conjunction with the scheduling module determining the least cost route and port for the videoconference, the performance awareness module monitors the performance of the network videoconferencing equipment and systems, also referred to herein as videoconferencing assets, to ensure the assets are performing within administrator-defined parameters. At step 910, the monitoring module is initiated by a network administrator or similar person responsible for maintaining the network. The monitoring module may be initiated together with the other software modules in the exemplary embodiment of the present invention, for example at system start-up, or separately. At step 920, the process determines the performance criteria defined by the administrator. The administrator can choose what parameters and what parameter values to set. These parameters and parameter values may be stored in equipment tables 925 or other database files accessed by the server application.

At step 930, the process continuously monitors the asset performance. This monitoring is done by sending a signal that simulates the signals associated with videoconferencing. Parameters that may be measured include network latency and jitter. One skilled in the art would appreciate that any other parameter, such as packet loss, could be measured in assessing system performance.

At step 940, the process compares the measured values with the established criteria. Typical criteria values may be 10 milliseconds for jitter and 80 milliseconds for latency. However, any value could be established for these parameters and other system performance parameters could be chosen. If the criteria are not exceeded, the process returns to step 930, i.e., the monitoring process continues. If one or more criteria are exceeded, the process moves to step 950 and the process determines if the videoconferencing assets that exceed performance criteria are to be used on a videoconference within a short period of time, for example, fifteen minutes.

If so, the process moves to step 960. At this step, the process warns the participants of the videoconference of the problem. These warnings can take the form of e-mail messages, pages, or other similar alerts. The process proceeds to step 970, or, in the case where no videoconference is scheduled within a short time, proceeds directly from step 950 to step 970. At step 970, system administrators or others responsible for maintaining the equipment are warned. Again, these warnings can take the form of e-mail messages, pages, or other similar alerts. The process then returns to step 930 and performance measurements continue.

The process flow diagram depicts the processing of the performance module as a series of events. In the exemplary embodiment of the present invention, step 930, the monitoring step, continues to be performed in parallel to the other tasks performed by the performance awareness module.

Figure 10:
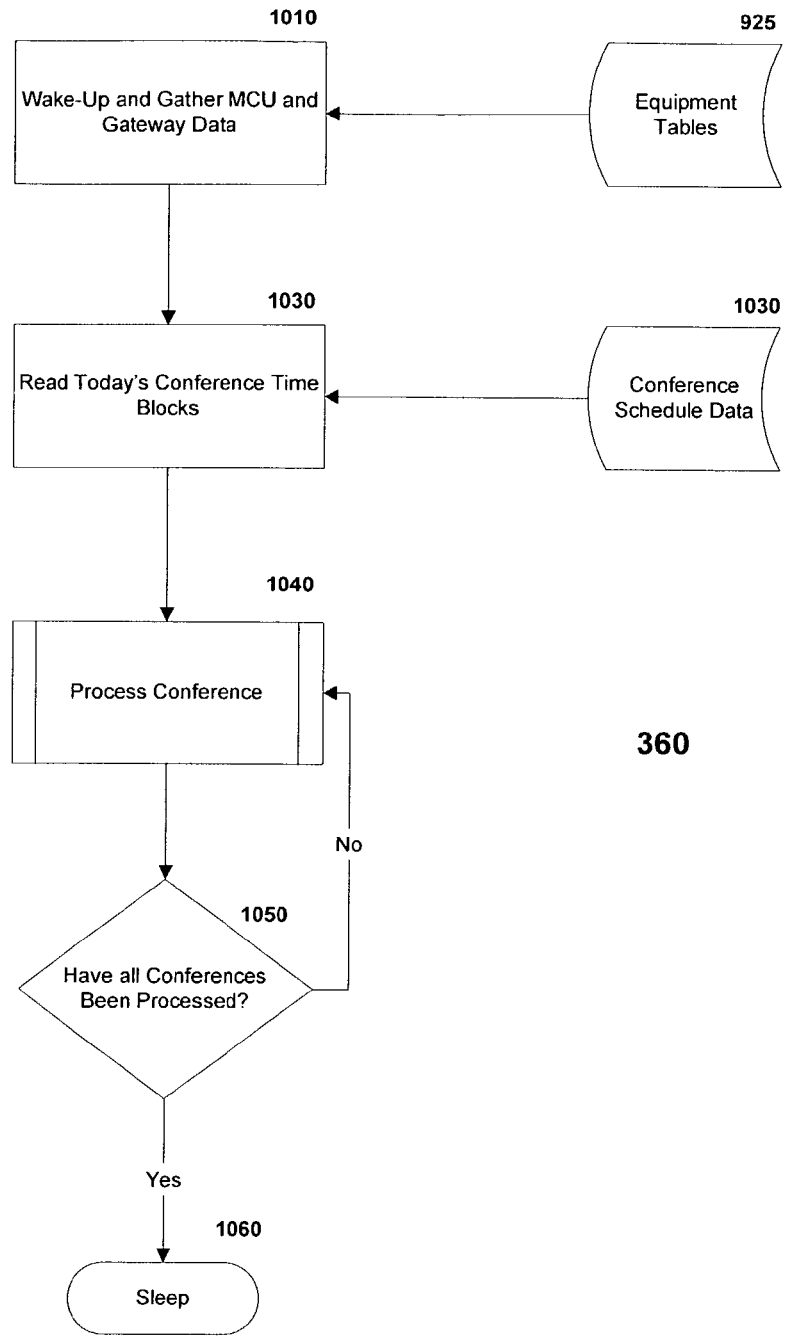
FIG. 10 is a flow chart that presents the process flow for initiating and ending videoconferences for an exemplary embodiment of the present invention.

FIG. 10 presents a flow chart for processing videoconferences 360 for an exemplary embodiment of the present invention. At step 1010, a scheduling services aspect of the exemplary embodiment is started, typically at the beginning of a day. The process updates information on equipment capabilities for the network, taking information from equipment tables 925. At step 1020, the process determines the videoconference calls that have been scheduled for a given time interval, such as the current day. This determination is based on conference schedule data 1030. At step 1040, a conference is processed, such as the first conference scheduled for the time period. This processing may involve either starting or ending the conference, or both. This step is discussed in detail below, in conjunction with FIG. 11.

At step 1050, the process determines whether all scheduled conferences for the time period, as determined at step 1020, have been processed. If so, the process moves to step 1060 and sleeps until awoken at step 1010. If not, the process returns to step 1040 and processes the next scheduled conference.

Figure 11:
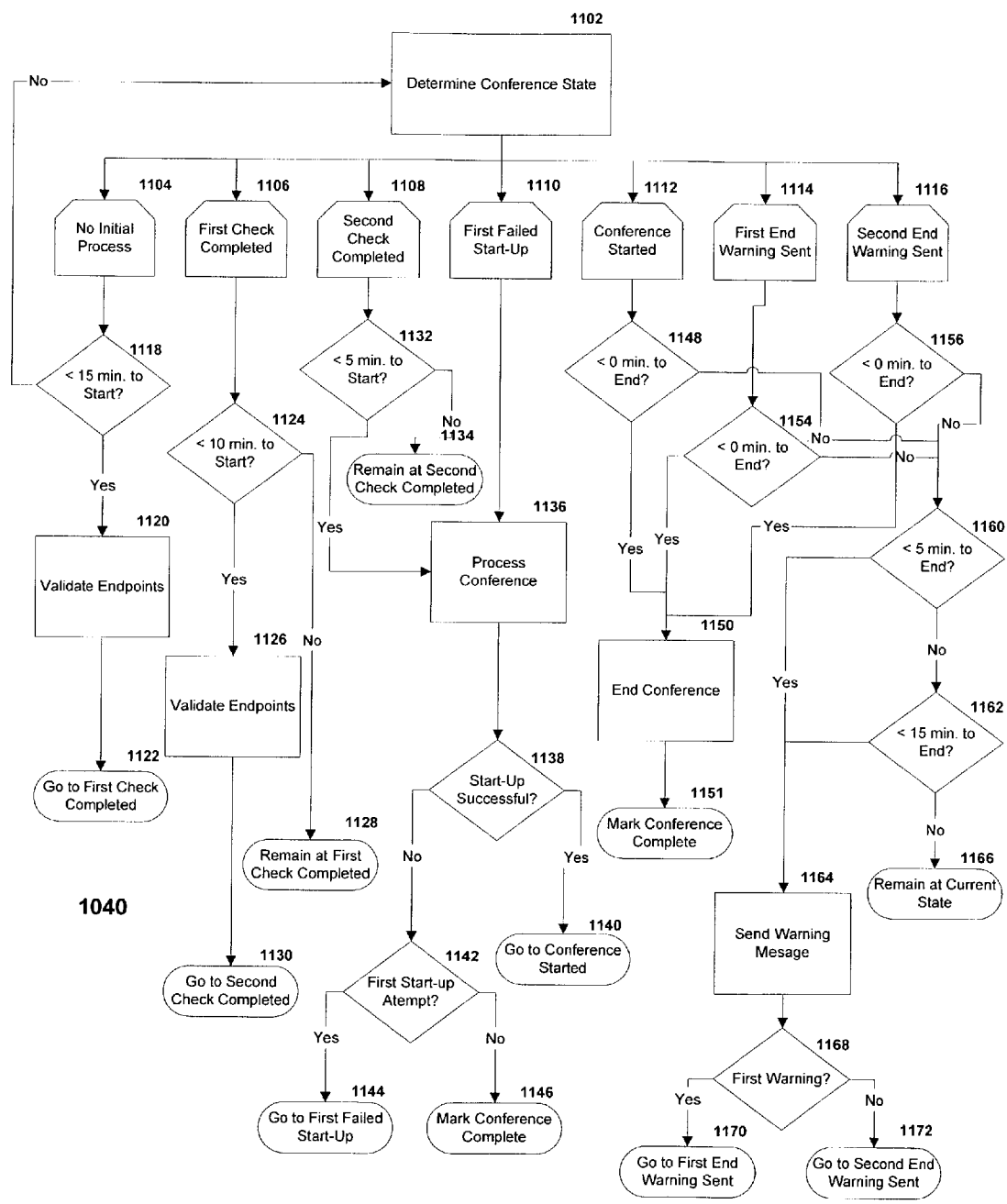
FIG. 11 is a flow chart that presents details on initiating and ending videoconferences for an exemplary embodiment of the present invention.

FIG. 11 presents a process flow diagram detailing the conference processing step. At step 1102, the process determines the conference state. Typically, the state will be No Initial Process 1104 for a conference not yet underway. From that state, the process determines if the conference is to start in less than a given time interval, such as fifteen minutes or some other selected time. If not, the process returns to step 1102 and loops to state 1104 until the videoconference is within the given time interval, such as fifteen minutes. If so, the process moves to step 1120 and validates endpoints. This validation may include ensuring that all necessary equipment to complete the videoconference is operational and a least cost port analysis may be performed, similar to the process described above in conjunction with FIG. 7. Once the endpoints have been validated, the process moves to step 1122, which changes the conference state to a First Check Competed state 1106.

At the First Check Competed state 1106, the process moves to step 1124 and determines if the videoconference is to be initiated in less than a set time, such as ten minutes. If no, the process moves to terminal point 1128, which causes the process to remain at the First Check Competed state 1106. If yes, the process moves to step 1126 and validates endpoints. Once the endpoints have been validated, the process moves to step 1130, which moves to a Second Check Competed state 1108.

At the Second Check Competed state 1108, the process moves to step 1132 and determines if the videoconference is to be initiated in less than a set time, such as five minutes. If no, the process moves to terminal point 1134, which causes the process to remain at the Second Check Competed state 1108. If yes, the process moves to step 1136 and processes the conference. In this step, the videoconference may be auto-launched or the parties may otherwise be connected to the videoconference. The process then moves to step 1138 and the process determines of the start-up was successful. If yes, the process moves to terminal 1140, which moves the conference state to a Conference Started state 1112.

If the start-up was not successful, the process moves to step 1142 and determines if this attempt was the first start-up attempt. If yes, the process moves to terminal 1144, which moves the process to a First Failed Start-Up state 1110. From that state, the process moves to step 1136 and repeats the steps as described above. If the failed attempt is not the first failed attempt, the process moves to step 1146 and completes the processing. In other words, in this exemplary embodiment, the process tries to start-up the conference twice. If both attempts are unsuccessful, the process stops. On skilled in the art would appreciate that other embodiments could employ any number of attempts to begin a conference.

During a videoconference call, the processing is at the Conference Started state 1112. The process moves to step 1148 and determines if the conference is past the end time for the videoconference, as indicated during scheduling. If not, the process moves to step 1160 and determines if the end time is within a certain time, such as five minutes. If not, the process moves to step 1162 and determines if the end time is within a different time, such as fifteen minutes. If no, the process moves to terminal 1166 and remains at the current state, Conference Started 1112.

If, at step 1148, the videoconference is past the end time, then the process moves to step 1150 and ends the conference. The process then moves to terminal 1152 and marks the conference complete. If, at step 1160, the videoconference is less then the given time, say five minutes, from ending, the process moves to step 1164 and sends a warning message that the conference is about to end. At step 1168, the process determines if this warning is the first warning. If yes, the process moves to terminal 1170, which changes the state to a First End Warning Sent state 1114. Otherwise, the process moves to terminal 1172, which changes the state to a Second End Warning Sent state 1116.

From the First End Warning Sent state 1114, the process moves to step 1154 and determines if the time for the conference to end has passed. If yes, the process moves to step 1150 and ends the conference, as described above. If no, the process moves again to step 1160 to decide if the conference is to end in less than a set time, such as five minutes. In this case, the answer will be yes for this embodiment, since the only way to get to the First End Warning Sent state 1114 is for the time until the conference ends to be less than five minutes. The process then moves to step 1164 and proceeds as described above.

At step 1162, if the time until the conference ends is less than fifteen minutes, the process then moves to step 1164 and proceeds as described above. Similarly, from the Second End Warning Sent state 1116, the process moves to 1156 and determines if the time for the conference to end has passed. If yes, the process moves to step 1150 and proceeds as described above. Otherwise, the process moves to step 1160 and proceeds as described above.

In view of the foregoing, one skilled in the art will appreciate that the present invention supports the scheduling and performance monitoring of videoconferences over a computer network. An embodiment of the present invention includes the steps of determining for a schedule request by an endpoint if the necessary bandwidth to conduct a videoconference is available and reserving that bandwidth against future scheduling requests. Also, the embodiment measures the performance of equipment and systems used to conduct the videoconference and determines if the equipment and systems are performing at a level necessary to conduct the videoconference. Alternative embodiments may include selecting multipoint endpoints to support the videoconference, scheduling videoconferences over two independent networks, emulating routers to ensure that the least cost route for the videoconference is selected, and responding to a scheduling request by informing the user to reschedule the videoconference when the network cannot support the videoconference. Also, alternative embodiments may auto-launch the videoconference and notifying videoconference participants when equipment encounters problems just prior to a videoconference.

We claim:

1. A method for scheduling a videoconference over a network, comprising:
    in response to a request to schedule a videoconference, determining if a sufficient quantity of bandwidth necessary to support the requested videoconference will be available on the network;
    if a sufficient quantity of bandwidth is available, calculating a least cost route over which to conduct the videoconference, wherein calculating a least cost route comprises emulating a router protocol;
    determining a port that has the least value as a network resource and is capable of conducting the requested videoconference;
    reserving equipment along the least cost route and the least value port; and
    monitoring the performance of the equipment along the least cost route by sending data packets along the least cost route to simulate data packets sent during a videoconference and determining network latency and jitter along the least cost route.

2. The method of claim 1, further comprising determining whether the videoconference must be handled by a multipoint control unit.

3. The method of claim 1, further comprising notifying a user if the quantity of bandwidth available on the network for the videoconference at the time specified in the scheduling request is not sufficient to support the videoconference.

4. The method of claim 3, further comprising receiving a reschedule request in response to the notification.

5. The method of claim 1, further comprising, if the measured criteria are not acceptable, sending a warning to one or more participants of the scheduled videoconference.

* * * * *